UNITED STATES PATENT OFFICE.

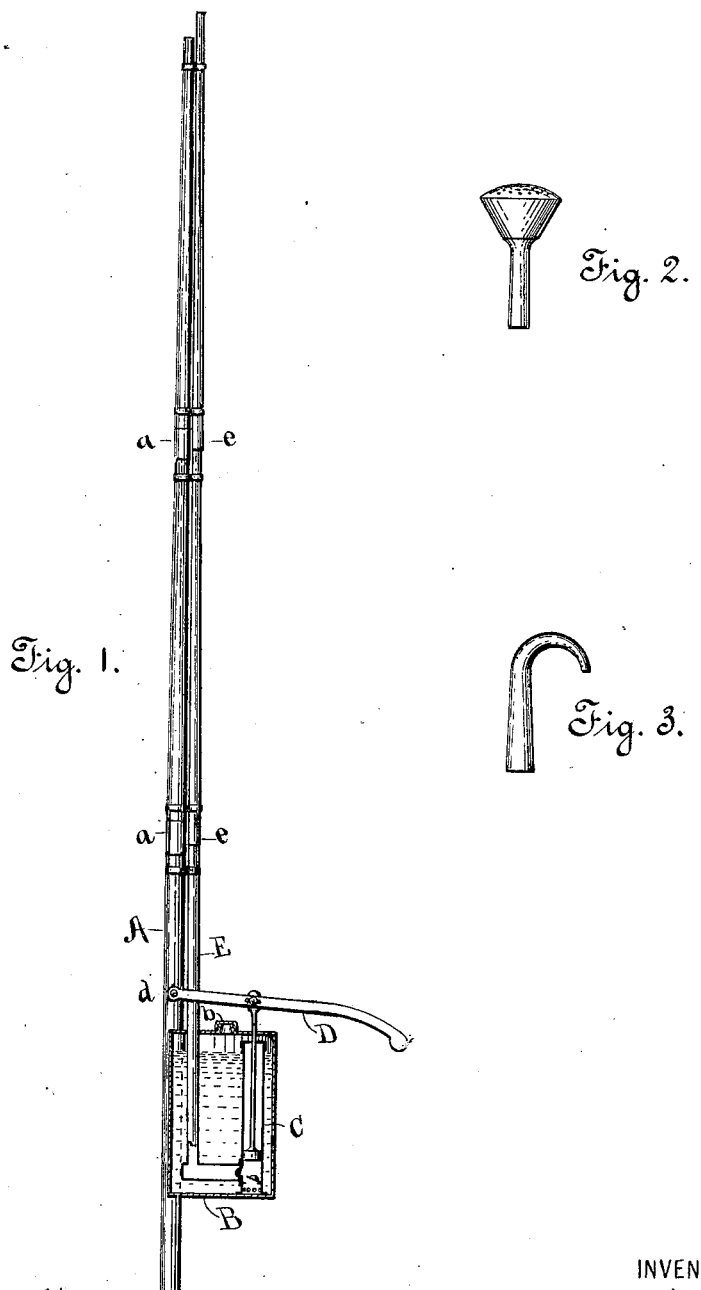

FRED C. HUTCHINGS, OF VIRGIL, NEW YORK.

SPRAYER FOR FRUIT OR OTHER TREES.

SPECIFICATION forming part of Letters Patent No. 631,115, dated August 15, 1899.

Application filed November 28, 1898. Serial No. 697,572. (No model.)

*To all whom it may concern:*

Be it known that I, FRED C. HUTCHINGS, a citizen of the United States, residing at Virgil, in the county of Cortland and State of New York, have invented a new and useful Sprayer for Fruit or other Trees, of which the following is a specification.

My invention relates to improvements in sprayers whereby insect-destroying liquid may be thrown or sprayed in considerable quantities from a tank by means of a suitable pump or forcing device; and the object of my improvements is to provide an apparatus of this nature which shall be light and easily carried about and which may be operated from the ground to effectively spray a tree of any height, and whereby the topmost branches and foliage may be reached by the spraying liquid. I accomplish this object by the device illustrated in the accompanying drawings, in which—

Figure 1 represents a side elevation of my sprayer, with the tank and force-pump shown in section; and Figs. 2 and 3, details showing nozzles to be attached to the top of the delivery pipe or tube.

In the drawings, A represents a light and strong pole, similar to a fishpole, which may be jointed at *a a*. Attached to the butt-end of this pole at a suitable distance from the lower extremity is a tank B, of sufficient capacity to hold a desirable quantity of the spraying mixture, which mixture is poured into the tank through the filler-plug *b*.

C represents any desirable form of force-pump operated by the handle D, which may be pivoted to the pole, as at *d*, or to a standard rising from the tank. From the force-pump a pipe or tube E extends to the top of the pole, being fastened thereto by suitable straps or clamps, and this pipe or tube may be jointed at *e e* to correspond with the joints of the pole, each corresponding pole-joint and pipe-joint being strapped or fastened together and there being a sufficient number of these joints to extend the pole and conduit-pipe to any desirable height. While I have represented the pole and pipe as jointed, they may, however, be made in one continuous length; but I prefer the jointed arrangement, as it makes the apparatus more convenient for storage and also more convenient for adjusting to different heights. The pipe or tube E may be made of light tin or other metal, the pole giving the necessary strength and rigidity.

In Fig. 2 I have represented an ordinary rose-nozzle, which may be attached to the top of the tube E for spreading the spray, and in Fig. 3 I have represented a gooseneck or drop nozzle, which when attached to the top of the pole E will permit of kerosene-oil or other desirable liquid being delivered directly into the worm-nests.

In operation, the pole and tubing having been adjusted to a height desirable for the trees to be sprayed and the tank having been filled with kerosene or any desired insecticide mixture, the operator rests the butt of the pole on the ground or the bottom of the tank against his body or supports the tank by a strap from his shoulder and moving the top of the pole around among the branches of the tree while operating the pump throws the liquid wherever desirable, either covering the whole tree or spraying parts of the tree, as may be necessary.

Having thus described my improvements, what I claim as my invention, and desire to secure by Letters Patent, is—

1. In a spraying device for trees, the combination of a pole, a tank and force-pump attached to the butt-end thereof, and a delivery pipe or conduit running from the force-pump to the top of the pole.

2. In a spraying device for trees, the combination of a jointed pole, a tank and forcing device attached to the butt of the pole, and a pipe or tube extending from the forcing device to the top of the pole and jointed to correspond with the joints of the pole.

In testimony whereof I have affixed my signature in presence of two witnesses.

FRED C. HUTCHINGS.

Witnesses:
W. B. MUNCEY,
F. D. SEAMANS.